April 10, 1962 C. H. KEHM 3,029,312

COMMUNICATION SYSTEM

Filed Nov. 13, 1957 3 Sheets-Sheet 1

Inventor
Clarence H. Kehm
By Schroeder, Hofgren, Brady & Wegner
Attorneys

Inventor
Clarence H. Kehm
By
Schroeder, Hofgren, Brady & Wagner
Attorneys

April 10, 1962 C. H. KEHM 3,029,312

COMMUNICATION SYSTEM

Filed Nov. 13, 1957 3 Sheets-Sheet 2

Inventor
Clarence H. Kehm
By Schroeder, Hofgren, Brady & Wegner
Attorneys 3,029,312
COMMUNICATION SYSTEM
Clarence H. Kehm, Chicago, Ill., assignor to W. C. Dillon & Company, Inc., a corporation of Illinois
Filed Nov. 13, 1957, Ser. No. 696,188
11 Claims. (Cl. 179—15)

This invention relates to an improved carrier wave telephone communication system.

The present invention represents an improvement over the systems and circuits disclosed and claimed in Dillon and Kehm Patents 2,535,906 and 2,604,544, and Dillon and Kehm application Serial No. 409,888, filed February 12, 1954, now abandoned. The apparatus and circuits disclosed and claimed herein are particularly designed for use with the carrier system disclosed and claimed in Dillon and Kehm application Serial No. 679,840, filed August 23, 1957.

A principal object of the present invention is to provide an improved carrier telephone system incorporating a novel signalling arrangement which insures actuation of the central station equipment on initiation and termination of a call; and, in systems incorporating dial equipment, an improved dial signalling arrangement.

One feature of the invention is that the subscriber station includes means for producing signals indicating the initiation and termination of a call, and the corresponding central station unit includes circuitry responsive to these signals for indicating, at the central station, the condition of the subscriber station. Another feature is that a similar signal is produced and utilized for dialing. A further feature is that the subscriber station includes a handset, a support for the handset, switch means associated with the support and actuated by the handset, and circuitry including the switch means for producing the desired signals during removal and replacement of the handset on the support therefor.

Still another feature is the provision, at the subscriber station, of an oscillator and two tuned circuits therefor, with switch means for connecting one or the other of the circuits with the oscillator to indicate initiation and termination of a call. Yet a further feature is that the oscillator is made up of an amplifier element normally connected to the microphone circuit, a circuit connectable with the amplifier for operating it as an oscillator and switch means actuable to connect the oscillator circuit to the amplifying element and to disconnect the microphone therefrom.

Another feature is that the subscriber unit includes a modulator-demodulator network connected to the carrier wave system, a transmitting channel including a first amplifying element having an output connected to the network, a microphone connected to the amplifying element, a circuit connectable with the amplifying element for operating it as an oscillator, and switch means actuable to connect the second circuit to the amplifying element and simultaneously to disconnect the microphone therefrom, and a receiving channel including a second amplifying element having an input connected to the network, two outputs with a signalling device connected to one of the outputs and a receiver connected to the other. And a further feature is that the transmitting and receiving channels are coupled with the modulator-demodulator network through an anti-side tone coupling device.

A further feature is that the central station unit includes first circuit means actuated by a first signal from the subscriber station for indicating initiation of a call and second circuit means actuated by a second signal from a subscriber station for indicating termination of a call. Another feature is that the first and second circuit means actuate and deactuate, respectively, a latching relay in the signal station. And a further feature is that the latching relay which is actuated by the first signal from the subscriber station has a contact through which a dialing circuit is completed, and the system includes a dialing relay responsive to a dialing signal from a substation and a contact actuated by the dialing relay and connected in the dialing circuit.

Yet another feature is that the first circuit means actuated by a first signal from the substation includes a first signal channel and the second means, which is actuated by the second signal from the substation includes a second signal channel; and that the signal channels include frequency responsive filters tuned to different frequencies.

A further feature is that the circuit means in the central station unit is actuated by a signal in the audio range from the substation and is responsive only to such audio signal which is higher in amplitude than a voice signal of the same frequency from the substation.

Further features and advantages of the invention will readily be apparent from the following specification and from the drawings, in which.

The present application is not concerned with details of the overall operation of a carrier telephone, and only such description of the overall system as is desirable for an understanding of the present invention will be given herein. Further information with regard to these systems may be found in the aforementioned Dillon and Kehm patents and pending applications.

Figure 1:
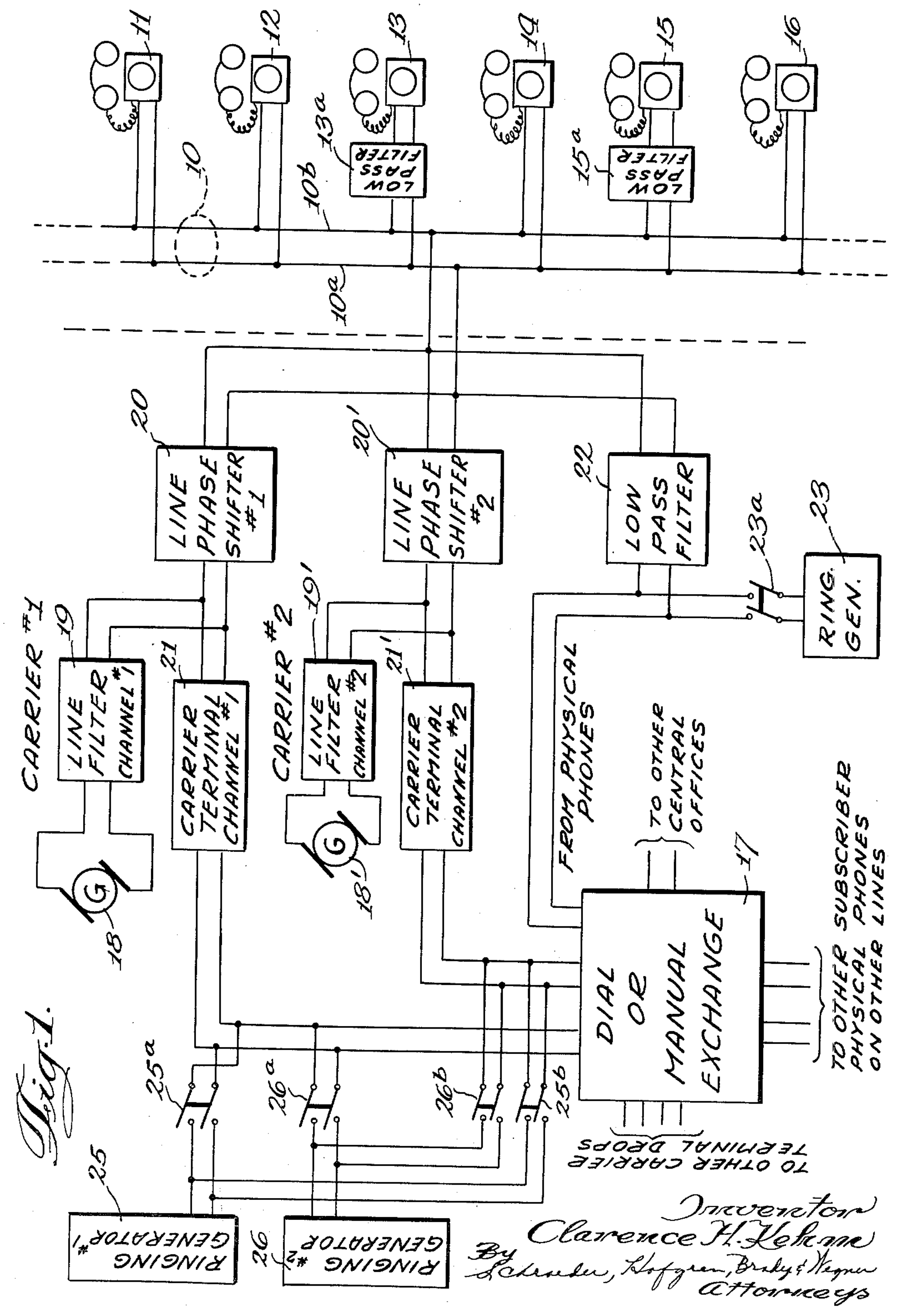
FIGURE 1 is a block diagram of a carrier wave telephone system embodying the invention.

Turning now to FIGURE 1, a portion of a carrier telephone system is shown in block form. The particular system shown in this figure is that disclosed and claimed in Dillon and Kehm application Serial No. 679,840, filed August 23, 1957. The elements of the system may be divided into three major groups, the equipment at the central station, lying to the left of the broken line in FIGURE 1, the transmission line 10, here shown as comprising wires 10*a* and 10*b*, and the subscriber units 11, 12, 13, 14, 15 and 16. The system shown in FIGURE 1 provides for the use of both carrier subscriber phones and "physical" phones or those which operate on a modulated direct current rather than a modulated carrier wave, on a single transmission line 10. The system further permits "party line" operation of the carrier subscriber phones with several subscriber phones operated on the same carrier frequency. The physical subscriber phones 13 and 15 are connected to the transmission line 10 through low pass filters 13*a* and 15*a* to prevent the carrier frequency from affecting the circuits at the physical subscriber phone.

The central station includes an exchange 17, which may have either manual or dial equipment of a suitable type. Details of a suitable manual exchange are shown in the aforementioned Dillon and Kehm patents. For each carrier frequency in the system, the central station includes a carrier generator, as generator 18 for channel #1 and generator 18' for channel #2, line filter 19 and 19', a line phase shifter 20 and 20' and carrier terminal unit 21 and 21'. A connection for the physical phones between the transmission line 10 and the exchange 17 is made through a low pass filter 22, which prevents the carrier frequencies from affecting the circuits in the exchange.

The carrier signals from the generators 18 and 18' are coupled through their respective filters and phase shifters to the transmission line 10. When a call originates from one of the carrier subscriber stations, as station 11, the act of lifting the handset of the phone provides a signal which causes the actuation of certain circuits in the carrier terminal for the channel on which that subscriber station operates. If the telephone system utilizes a manual exchange, this may light a light at an operator's board in the central exchange whereupon the operator makes connection with the calling party to determine who is being called. Appropriate connections are then made by the operator at the exchange, either to a carrier terminal circuit, if the called party has a carrier wave unit, or to a physical phone circuit. If the exchange has dial equipment, the connections are made automatically.

A ringing signal is impressed on the circuit of the called party, either by the operator, or through automatic circuits. For example, if the party being called has a physical phone, the operator might ring such party by closing the switch 23*a* connecting ringing generator 23 to the physical phone circuit. As mentioned above, the carrier phones may be operated in a party line fashion, with several subscriber units on the same carrier frequency. In order to distinguish between subscriber units, ringing signals of different frequencies are utilized, and loud speakers or other signalling devices which are frequency sensitive are provided at the subscriber stations. In the system of FIGURE 1, two carrier ringing generators 25 and 26 are shown, either of which may be connected to either of the carrier channel terminal units 21 and 21' through switches 25*a*, 25*b*, 26*a* and 26*b*.

The carrier frequency at the central station should have a power level of the order of 25 db, in a system utilizing a transmission line, either a cable or open-wire line, or a combination thereof, having a power loss at the most distant subscriber unit of the order of 15 db. Thus the carrier at the subscriber station has a power level of at least 10 db and is substantially 100% modulated by the audio signal from the subscriber unit. As the output of the microphone used in a standard handset is substantially less than this, the audio signal is amplified before modulating the carrier wave, as will appear in more detail later. The audio signal at the central station after having been removed from the carrier wave by the modulator in the carrier terminal unit has a power level of at least −6 db. This signal is then used to modulate the carrier wave of the party being called, in a situation where the called party has a carrier phone, and the demodulated signal received at a subscriber station is of the order of −21 db. This signal is again amplified before it is connected to the receiver of the handset.

Figure 2:
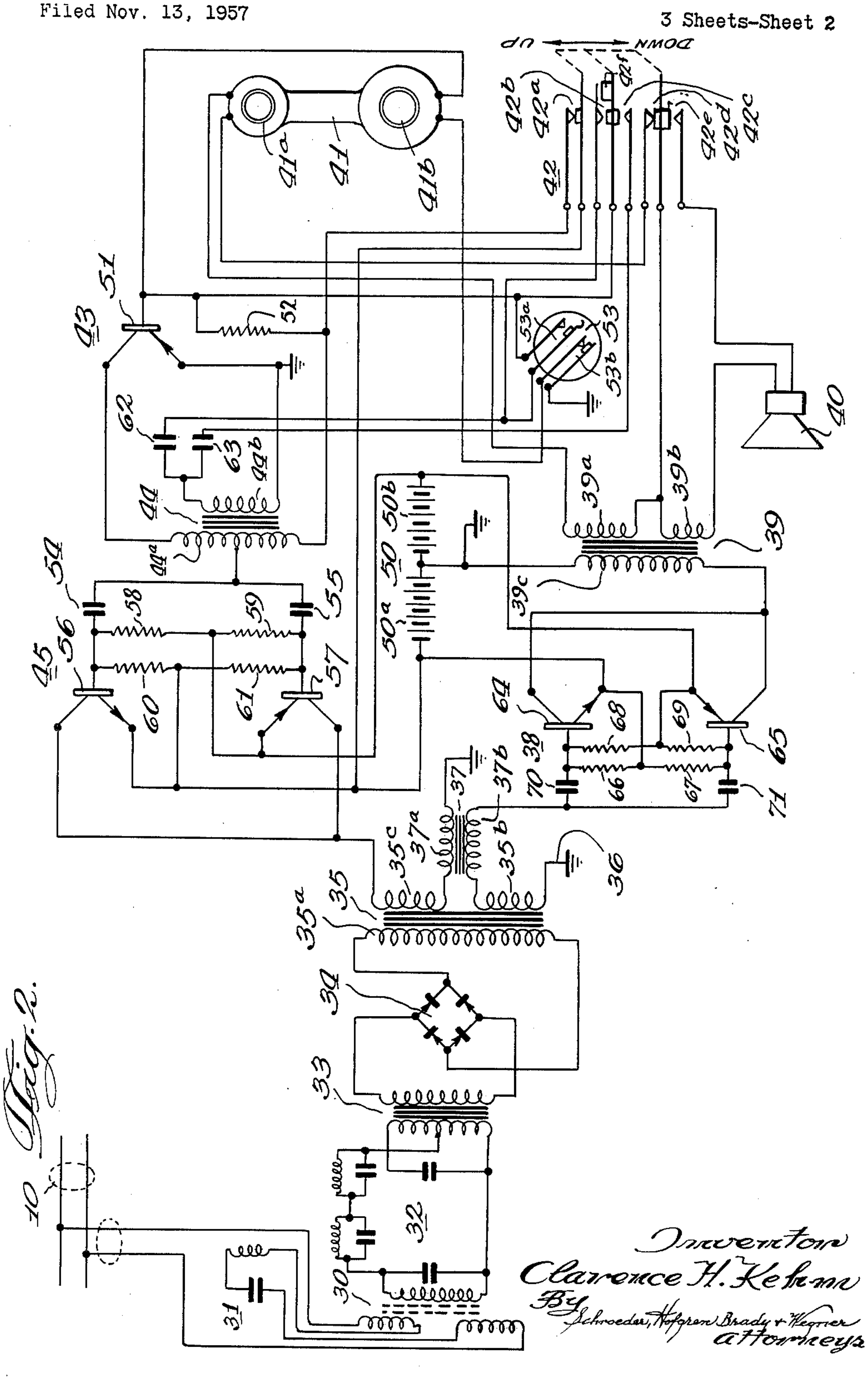
FIGURE 2 is a schematic diagram of a subscriber station.

Turning now to FIGURE 2 of the drawings, the circuit of a typical subscriber station will be described. The subscriber unit is connected to the transmission line 10 through a transformer 30, the primary winding of which includes a series resonant circuit 31 tuned to the frequency of the carrier on which the station operates. The input transformer presents a low impedance to the carrier frequency of the unit but an open circuit to direct current which may be on the transmission line and a high impedance to audio signals and other carriers. Connected to the secondary winding of input transformer 30 is a band pass filter 32 designed to pass a carrier frequency and its side bands. A coupling transformer 33 connected to the output of filter 32 is connected to the input of a bridge type modulator-demodulator unit 34, employing four cold rectifying units. The audio signal derived from the modulator-demodulator unit 34 is connected to winding 35*a* of a modulator-demodulator transformer 35. A winding 35*b* on the modulator-demodulator transformer has one terminal connected to a common or ground connection 36 while the other terminal is connected through one winding 37*a* of an anti-side tone transformer 37 to the input of a push-pull transistor power amplifier 38. The output of the amplifier is developed in transformer 39, which has two secondary windings 39*a* and 39*b*. The amplified audio signal is utilized to actuate the signalling device at the subscriber station, as frequency sensitive loud speaker 40, or to power the receiver 41*a* of the handset 41, depending upon the position of the contacts of switch 42, associated with the handset support, as will appear in detail later.

Voice signals picked up by the microphone 41*b* are coupled to the transistor amplifying element 43, serving as a preamplifier, the output which is coupled through inductor 44*a* to push-pull transistor power amplifier 45. The amplified audio signal from the subscriber station is coupled through winding 35*c* of modulator-demodulator transformer 35 to the modulator-demodulator 34 in which it modulates the carrier wave on which the station is operating. This modulated signal is in turn demodulated at the central station and the audio signal derived therefrom coupled through the central station circuits to the other party to the conversation.

The purpose of the anti-side tone transformer 37 is to prevent the output signal of power amplifier 45 in the transmitting channel feeding directly into the power amplifier 38 in the receiving channel. Of course, an output signal from amplifier 45 flowing through winding 45*c* induces a corresponding signal in winding 35*b* of the modulator-demodulator transformer. The signal which flows from winding 35*c* however also flows in winding 37*a* of the anti-side tone transformer and induces a corresponding signal in winding 37*b*. The windings 37*a* and 37*b* are so designed and phased that the signal induced in winding 37*b* cancels the signal in winding 35*b* so that there is no signal input to amplifier 38 during transmission from the station.

The circuit of the subscriber unit will now be described in detail and values assigned to the various circuit components shown. It is to be understood that the circuit values given are representative of an operative unit and are not to be considered critical as many modifications are to be apparent to those skilled in the art.

The transistor amplifiers 38, 43 and 45 are powered from a D.C. supply 50 made up of two 12 volt sections 50*a* and 50*b*, with the positive terminal of section 50*a* and the negative terminal section 50*b* being connected to ground. Power supply unit 50, which is shown to be a battery, is preferably a mercury battery which has extremely long life. Other types of batteries may of course be used, but may require replacement at more frequent intervals. As an alternative, the power for operating the transistor amplifiers in the subscriber station may be transmitted from the central station over transmission line 10.

Amplifier element 43, which doubles as a preamplifier for the audio power amplifier 45, and as an audio oscillator for generating the signals transmitted to the central station upon initiation and termination of a call, and for dialing, may be a PNP junction transistor, as a 2N34, and is connected for grounded emitter operation. The switch 42 is shown in FIGURE 2 with its movable contacts in raised position, the position they have when the handset 41 is removed from its support; and the circuit is in condition for transmitting and receiving voice messages. The negative base bias for transistor 51 is derived from section 50*a* of the power supply by a circuit completed through contact 42*a* of switch 42, and resistor 52, 220,000 ohms, while a negative voltage is applied to the collector through the secondary winding of transformer 44. The microphone 41*b* is connected through normally closed contact 53*b*, associated with the dialing mechanism 53, to ground, and to the base or input element of transistor 51. The amplified signal developed in inductor 44*a* is coupled through capacitors 54 and 55, each 1.0 μfd. (microfarad) to power amplifier 45. The audio power amplifier is made up of a pair of junction transistors 56, a 2N35 NPN element, and 57, a 2N34 PNP element. Bias for transistors 56 and 57 is obtained from the power source 50 through a resistive network including resistors 58, 75,000 ohms, 59, 12,500 ohms, 60, 12,500 ohms and 61, 75,000 ohms. The collectors of transistors 56 and 57 are connected in parallel and to winding 35c of the modulator-demodulator transformer 35 and through winding 37a of the anti-side tone transformer 37 to ground.

For signalling to the central station to indicate the initiation or termination of a call, or for dialing, one or the other of capacitors 62 and 63 are connected through feedback transformer winding 44b into the collector-base circuit of transistor 51 forming an audio oscillator providing the desired signalling frequencies.

Power amplifier 38 which handles the incoming voice and ringing signals is substantially identical with amplifier 45, being made up of an NPN junction transistor 64, a 2N35, and a PNP junction transformer 65, a 2N34. Operating potentials are derived from a bias circuit including resistors 66, 12,500 ohms, 67 and 68, each 75,000 ohms and 69, 12,500 ohms. The signals from transformer 35 are coupled to the base elements of each of the transistors through coupling capacitors 70 and 71, each 1.0 μfd. The collectors of the two transistors are connected in parallel and to the primary winding 39c of transformer 39. When the phone is not in use and the handset is on its support, the movable elements of switch 42 are in the position opposite that shown in the drawing, and contact 42e is closed completing a circuit from secondary winding 39b to the frequency sensitive loud speaker 40, used for signalling the subscriber. When the phone is off the hook, as shown in the drawing, a circuit is completed through contact 42d of the switch connecting the receiver 41a of the handset to secondary winding 39a of transformer 39.

The transistor power amplifier units 38 and 45 are particularly selected for their low current drain, when not in use, in order to conserve the power in batteries 50a and 50b. When the handset 41 is on its support, contact 42a of the handset switch is open, breaking the bias circuit of transistor 51, so that there is no current drain in that circuit.

The operation of amplifying element 43 as an oscillator to provide the signalling frequencies which actuate circuits in the central station upon initiation and termination of a call, will now be described. When the handset 41 is on its support, all of the contacts of switch 42 reverse their connections shown in FIGURE 2. Thus, contact 42c is closed, completing a circuit connecting capacitor 63, 0.004 μfd., to the base of transistor 51. When a call is initiated, by lifting the handset from its support or cradle, contact 42a closes first, completing an energization circuit for transistor 51. As contact 42c is still closed, the amplifier element 43 operates momentarily as an oscillator, at a frequency of 2500 cycles per second. Contact 42c then opens and contact 42b closes, again momentarily completing an oscillator circuit with capacitor 62, 0.6 μfd., producing a signal having a frequency of 200 cycles per second. As the switch 42 completes its movement upon the lifting of the handset therefrom, insulating block 42f separates contacts 42b. When the dial mechanism 53 is actuated, two things occur. First, switch contacts 53b open, breaking the circuit of microphone 41b. Second, contacts 53a, which are connected in parallel with contacts 42b of the switch, close and open repeatedly in accordance with the number of digits dialed. This produces a series of pulses of 200 cycle signal representing the number dialed. When the handset is replaced, contact 42c of the switch closes for an instant before contact 42a opens, generating a short pulse of 2500 cycle signal indicating the termination of the call. The purpose of these signals will be apparent upon consideration of the central station circuits.

The central station equipment for one carrier channel will now be described with particular reference to FIGURE 3. The carrier wave is generated by a transistor oscillator 18 and the carrier is coupled through a transformer 75, line filter 76 and line phase shifter 20 to the transmission line 10. The line filter 76 has a band pass characteristic designed to pass the carrier frequency and with a cutoff 100 cycles on either side thereof. A modulator-demodulator unit 77 is connected through central office phase shifter 78 and band pass filter 79 to the line phase shifter 20. Audio signals to and from the modulator-demodulator unit 77 are coupled through audio transformer 80 and a low pass filter 81 to terminals 82 and 83 which form a part of the exchange equipment, as a central office "drop."

Low pass filter 81 has a T configuration with a pair of series inductors 84, each 32.7 millihenries, and a shunt leg including an inductor 85, 22.5 millihenries, in series with capacitor 86, 0.0913 μfd. Capacitor 87, 4 μfd. is a D.C. blocking capacitor.

Figure 3:
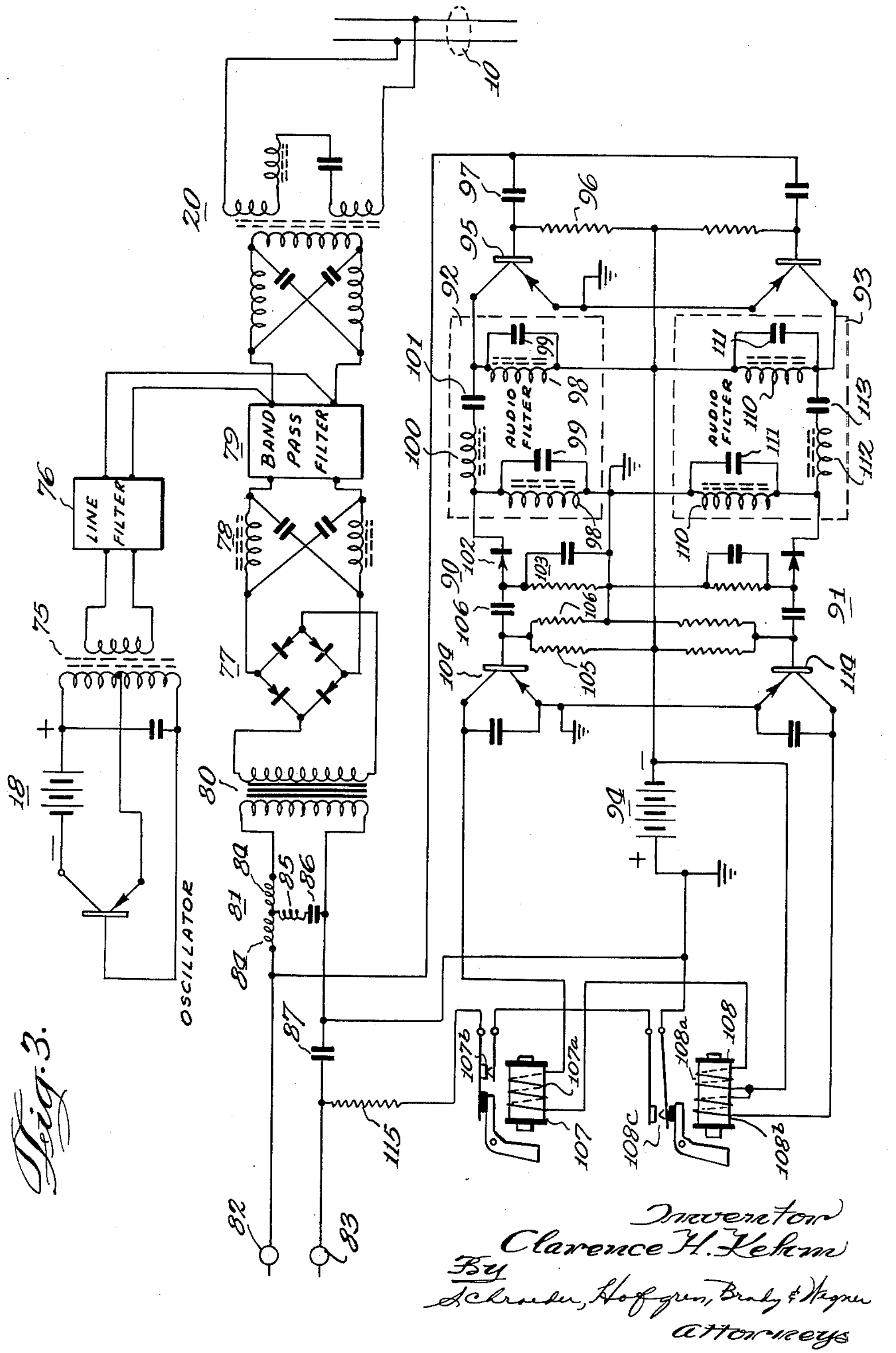
FIGURE 3 is a schematic diagram, partially in block form, of a central station, showing a central station unit for a single carrier frequency.

The circuits in the lower portion of FIGURE 3 handle the signals from the subscriber station indicating initiation and termination of a call and also provide for dialing, in exchanges which are provided with dial equipment. Two similar signal handling channels 90 and 91 are provided, one for the 200 cycle signal and the other for the 2500 cycle signal from the subscriber station. Channels 90 and 91 include audio filters 92 and 93, tuned to 200 and 2500 cycles per second, respectively, or to such other frequencies as may be provided from the subscriber station. With the exception of the filters, the two circuits are identical, and only the 200 cycle channel 90 will be described in detail.

The signal handling channel utilizes transistor amplifiers which are energized from a D.C. source 94, which may be a 24 volt battery. A preamplifier 95, a 2N34 junction transistor, is connected for grounded emitter operation and is biased through resistor 96, 240,000 ohms. The incoming signal is coupled through capacitor 97, 1.0 μfd., to the base of transistor 95. The amplified output of the transistor is coupled from the collector to band pass audio filter 92. The filter has a pi configuration with both shunt legs including parallel resonant circuits tuned to 200 cycles, and each including an inductor 98, 0.16 henries and capacitor 99, 4.0 μfd. The series arm of the filter comprises a series resonant circuit tuned to 200 cycles, including an inductor 100, 8 henries and a capacitor 101, 0.08 μfd. The output of filter 92 is rectified by diode 102 and a negative potential representing the audio signal is developed across diode load 103. A transistor control amplifier 104, a 2N34 junction transistor, is connected to the diode load; and a negative bias voltage is developed for the transistor through a voltage divider including resistor 105, 30,000 ohms and 106, 5000 ohms, establishing an operating condition of collector cutoff. A negative pulse resulting from a 200 cycle signal, is developed across detector load 103 and is coupled through capacitor 106, 1.0 μfd., to the base of transistor 104. This pulse brings the transistor amplifier into operation and current flows in the collector circuit which includes the energizing coils 107a and 108a of relays 107 and 108. The purpose of the relays will become apparent later.

The audio filter 93 in signal channel 91 is a band pass filter tuned to 2500 cycles per second, the frequency of the other signal from the subscriber station. The filter is similar in configuration to filter 92, but the tuned circuits are designed to resonate at 2500 cycles rather than 200. The parallel resonant circuits of the shunt legs are made up of an inductor 110, 0.001 henries, and a capacitor 111, 4.0 μfd. The series resonant circuit includes inductor 112, 8 henries and capacitor 115, 510 μμfd. Transistor amplifier 114 is biased at a collector cutoff condition, and when a 2500 cycle signal is received, it begins to conduct with an output current flowing in the circuit of the collector, through winding 108b of relay 108.

Relay 108 is a "latching" relay with a single normally open contact 108c. When the relay is energized by a current flowing through winding 108a, contact 108c is closed and remains closed until release winding 108b is energized. Contact 108c completes a circuit through contact 107b of relay 107 and resistor 115, 600 ohms, grounding terminal 83, connected to the central office "drop." In a manual exchange, this circuit actuates an indicator informing the operator regarding the initiation and termination of a call. Further details regarding the indicator circuits for the operator may be found in the aforementioned Dillon and Kehm patents. In a dial exchange, this circuit is connected with suitable dial equipment in the exchange.

It will be recalled that the signalling circuit in the subscriber station produces a short pulse of 200 cycle signal as the handset is lifted from its support. This signal is separated from the carrier in the demodulator unit 77, rectified in signal channel 90 and applied to the relay control circuit, energizing latching relay 108 and closing the contact 108c associated therewith. Relay 107 is also energized during the period of the signal, but at the end of the signal, contact 107b closes completing the circuit through the relay contacts and resistor 115. On termination of the call, as the handset is replaced on its support, a 2500 cycle signal is generated in the subscriber station which is similarly utilized in the carrier terminal equipment, being amplified in signal channel 91 and applied to latching relay release winding 108b breaking the circuit. In a system utilizing dial equipment, the subscriber station produces a series of 200 cycle pulses corresponding with the digits dialed. As these signals are received at the carrier terminal equipment, relay 107 is energized by each dial pulse opening contact 107b breaking the dialing circuit. These interruptions in the circuit are utilized by the dial equipment in the exchange to effect the proper connections for the desired call.

The amplitudes of the 200 and 2500 cycle signals from the subscriber station are greater than the amplitude of voice or conversation in signals of the same frequency. With transistor amplifiers 104 and 114 biased for collector cutoff, the normal voice signal is insufficient to cause actuation of the relay circuits.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a carrier telephone system, a subscriber station including: means for modulating a carrier received from a central station; means producing a first signal at a first frequency and coupling it to said modulating means on initiation of a call; means producing a second signal at a second frequency and coupling it to said modulating means on termination of a call; a dial; and means responsive to actuation of said dial producing a dialing signal at one of said frequencies and coupling it to said modulating means.

2. In a carrier telephone system, a subscriber station including: a handset; a support for said handset; switch means associated with said support and actuated by removal and replacement of said handset; means for modulating a carrier received from a central station; means actuated by said switch means generating a first signal at one frequency on removal of said handset and coupling such signal to said modulating means; and means actuated by said switching means on replacement of said handset generating a second signal at a second frequency and coupling it to said modulating means.

3. In a carrier telephone system, a subscriber station including; a handset; a support for said handset; switch means associated with said support and actuated by removal and replacement of said handset; an oscillator; a first tuned circuit connected through said switch means with said oscillator, the oscillator producing a first signal on removal of said handset; a second tuned circuit connected through said switch means with said oscillator, the oscillator producing a second signal on replacement of said handset; a dial; and means responsive to actuation of said dial, connecting a circuit with said oscillator, the oscillator producing a dialing signal.

4. In a carrier telephone system, a subscriber station including: a handset having a microphone; a support for said handset; switch means associated with said support and actuated by removal and replacement of said handset; an amplifier element; a circuit connecting said microphone with said amplifier element; circuit means connectable with said amplifier element for operating it as an oscillator to produce a signal, said switch means connecting said microphone with said amplifier element when the handset is removed from the support, and connecting said circuit means therewith during removal and replacement of the handset on said support; and a dial operably associated with said switch means for connecting said circuit means with said amplifying element to produce a signal on actuation of said dial.

5. A subscriber unit for a modulated carrier wave telephone system, comprising: a modulator-demodulator network connected to said system; a handset having a microphone and a receiver; a support for said handset; switch means associated with said support and actuated by removal and replacement of said handset; a transmitting channel including a first power amplifier having an output connected to said network, an amplifying element having an output connected to the input of said first power amplifier, a microphone, a circuit connecting said microphone with said amplifying element, a circuit connectable with said amplifying element operating it as an oscillator to produce a signal, said switch means connecting said oscillator element to said amplifying element during removal and replacement of said handset and connecting said microphone thereto when said handset is removed; and a receiving channel including a second power amplifier having an input connected to said network and an output, a signalling device and a receiver, said switch means connecting the signalling device to the output of the amplifier when the handset is on said support and connecting the receiver thereto when the handset is removed.

6. A subscriber unit for a modulated carrier wave telephone system, comprising: a single modulator-demodulator network connected to said system; a transmitting channel including an amplifier having an input and an output and a microphone connected to said input; a receiving channel including an amplifier having an input and an output with the receiver connected to said output; and transformer means having a first winding connected with said modulator-demodulator unit, a pair of windings inductively coupled with said first winding, one connected with the output of said transmitting channel amplifier and the other connected with the input of said receiving channel amplifier, and a second pair of windings inductively coupled to each other and electrically connected to said first pair of windings.

7. In a carrier telephone system, a central station unit including: first circuit means actuated by a first signal from a subscriber station indicating initiation of a call; second circuit means actuated by a second signal from a subscriber sttaion indicating termination of a call and deactuating said first circuit means; and circuit means rendered operative by said first circuit means and responsive to a dialing signal from said subscriber station.

8. In a carrier telephone ssytem, a central station unit including: a latching relay having a contact; first circuit means responsive to a first signal from a subscriber station, indicating initiation of a call, actuating said latching relay; second circuit means responsive to a second signal from a subscriber station, indicating termination of a call, releasing said latching relay; a dialing circuit completed through a contact associated with said latching relay; a dialing relay having a contact in said dialing circuit; and circuit means responsive to a dialing signal from a subscriber station actuating said dialing relay.

9. In a carrier telephone system, a central station unit including: first circuit means actuated by a first signal from a subscriber station for indicating initiation of a call, and including a first signal channel; second circuit means actuated by a second signal from a subscriber station for indicating termination of a call, and including a second signal channel; and a frequency responsive filter in each signal channel, each filter being responsive to a signal of different frequency, for selective actuation of said circuit means by control signals of different frequency.

10. A carrier telephone system, including: a subscriber station including means producing a first signal on initiation of a call, means producing a second signal on termination of a call, a dial and means responsive to actuation of said dial producing a dialing signal; and a central station unit including first circuit means actuated by said first signal indicating initiation of a call, second circuit means actuated by said second signal indicating termination of said call and deactuating said first circuit means, and circuit means rendered operative by said first circuit means and responsive to said dialing signal.

11. A carrier telephone system, including: a subscriber station including a handset, a support for said handset, switch means associated with said support and actuated by removal and replacement of said handset, an oscillator, a first tuned circuit for said oscillator connected through said switch means with said oscillator producing a first signal on removal of said handset, a second tuned circuit connected through said switching means producing a second signal on replacement of said handset, a dial, and means responsive to actuation of said dial connecting a tuned circuit with said oscillator producing a dialing signal; and a central station unit including a latching relay having a contact, first circuit means responsive to said first signal actuating said latching relay, second circuit means responsive to said second signal releasing said latching relay, a dialing circuit completed through a contact associated with said latching relay, a dialing relay having a contact in said dialing circuit, and circuit means responsive to said dialing signal actuating said dialing relay.

References Cited in the file of this patent

UNITED STATES PATENTS

| | | |
|---|---|---|
| 1,896,487 | Gibson | Feb. 7, 1933 |
| 2,440,239 | Almquist | Apr. 27, 1948 |
| 2,478,361 | Bartelink | Aug. 9, 1949 |
| 2,535,446 | Mitchell | Dec. 26, 1950 |
| 2,535,906 | Dillon et al. | Dec. 26, 1950 |
| 2,575,782 | Bartelink | Nov. 20, 1951 |
| 2,584,830 | Bascom | Feb. 5, 1952 |
| 2,596,977 | Brandt et al. | May 20, 1952 |
| 2,677,726 | Entz et al. | May 4, 1954 |
| 2,763,726 | Weller | Sept. 18, 1956 |
| 2,844,659 | Shaw | July 22, 1958 |
| 2,846,512 | Crofutt et al. | Aug. 5, 1958 |
| 2,857,464 | Singer | Oct. 21, 1958 |
| 2,894,075 | Kunckel | July 7, 1959 |